United States Patent
Liao

(10) Patent No.: US 10,018,714 B2
(45) Date of Patent: Jul. 10, 2018

(54) TWO-DIMENSIONAL RF HARMONIC IMAGING SYSTEM AND ALGORITHM

(71) Applicant: The United States of America Army Research Laboratory ATTN: RDRL-LOC-I, Adelphi, MD (US)

(72) Inventor: DaHan Liao, Laurel, MD (US)

(73) Assignee: The United States of America as represented by the Secretary of the Army, Washington, DC (US)

( * ) Notice: Subject to any disclaimer, the term of this patent is extended or adjusted under 35 U.S.C. 154(b) by 368 days.

(21) Appl. No.: 14/748,272

(22) Filed: Jun. 24, 2015

(65) Prior Publication Data

US 2018/0074179 A1    Mar. 15, 2018

(51) Int. Cl.
- G01S 13/02    (2006.01)
- G01S 13/06    (2006.01)
- G01S 13/10    (2006.01)
- G01S 7/285    (2006.01)
- G01S 7/282    (2006.01)

(52) U.S. Cl.
CPC .............. *G01S 13/06* (2013.01); *G01S 7/282* (2013.01); *G01S 7/285* (2013.01); *G01S 13/106* (2013.01)

(58) Field of Classification Search
CPC ........ G01S 13/106; G01S 7/024; G01S 7/282; G01S 7/285
USPC .......................................................... 342/90
See application file for complete search history.

(56) References Cited

U.S. PATENT DOCUMENTS

| | | | | |
|---|---|---|---|---|
| 5,245,587 A | * | 9/1993 | Hutson | G01S 3/802 367/100 |
| 2009/0009380 A1 | * | 1/2009 | Schnitzer | G01S 7/282 342/90 |
| 2014/0313071 A1 | * | 10/2014 | McCorkle | G01S 7/28 342/202 |
| 2015/0084811 A1 | * | 3/2015 | Mazzaro | G01S 13/343 342/176 |

OTHER PUBLICATIONS

Dahan Liao, "Scattering and Imaging of Nonlinearly Loaded Antenna Structures in Half-Space Environments," IEEE Transactions on Antennas and Propagation, vol. 62, No. 8, Aug. 2014. Date of publication May 9, 2014.

(Continued)

*Primary Examiner* — Timothy A Brainard
(74) *Attorney, Agent, or Firm* — Guy M. Miller; Alan I. Kalb

(57) ABSTRACT

A radar system for detecting a target containing electronic components. The radar system includes a radiofrequency transmitter which generates a radar signal at a fundamental frequency. A modulator modulates the radar signal at a modulation frequency and the modulated radar signal is coupled to a transmission antenna. A receiver receives an echo from the radar signal. A filter isolates the harmonics of the fundamental frequency from the echo and a demodulator then compares the phase of the harmonics of the echo with the phase of the harmonics of the radar signal and generates an output signal representative thereof. An imaging algorithm receives the output signal and creates a two-dimensional image of the received echo and then displays that image on a display.

9 Claims, 6 Drawing Sheets

(56) References Cited

OTHER PUBLICATIONS

Dahan Liao, Traian Dogaru, Anders Sullivan, "Large Scale, Full-Wave-Based Emulation of Step-Frequency Forward-Looking Radar Imaging in Rough Terrain Environments," Sensing and Imaging: An International Journal, vol. 15, pp. 1-29, 2014. Published online: Apr. 9, 2014.

Dahan Liao, "Generalized Wideband Harmonic Imaging of Non-linearly Loaded Scatterers," IEEE Transactions on Antennas and Propagation, vol. 63, No. 5, May 2015. Date of publication Feb. 20, 2015.

Dahan Liao, "Generalized Wideband Harmonic Imaging of Non-linearly Loaded Scatterers: Theory, Analysis, and Application for Foward-Looking Radar Target Detection," Army Research Laboratory Technical Report, ARL-TR-7121, Sep. 2014.

* cited by examiner

Fig-4a
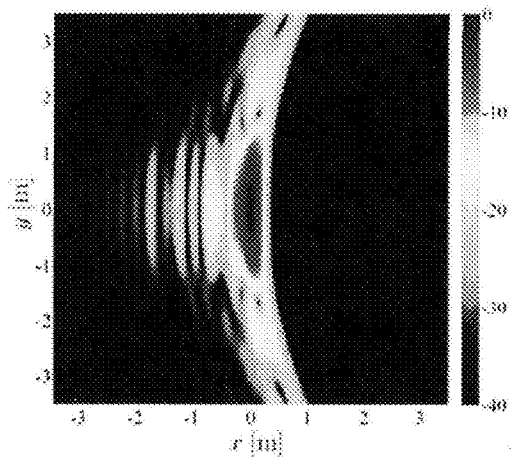
Fig-4b
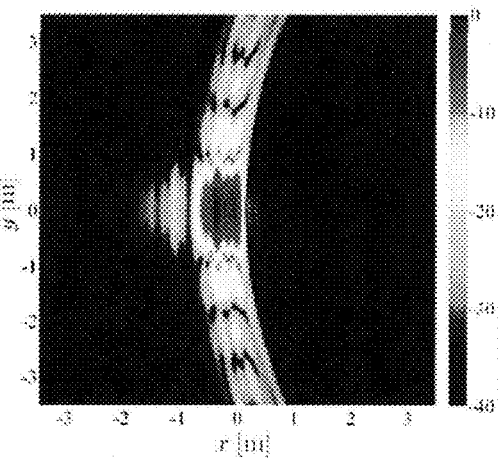
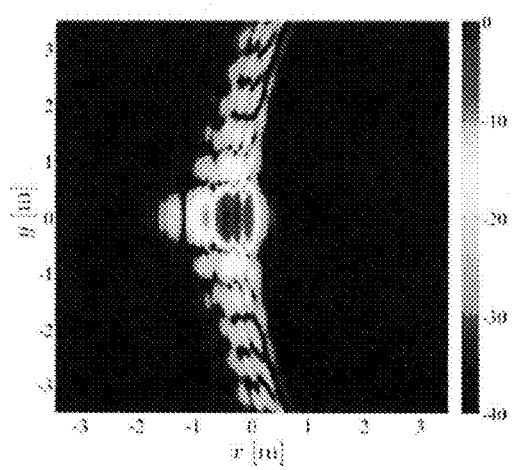
Fig-4c
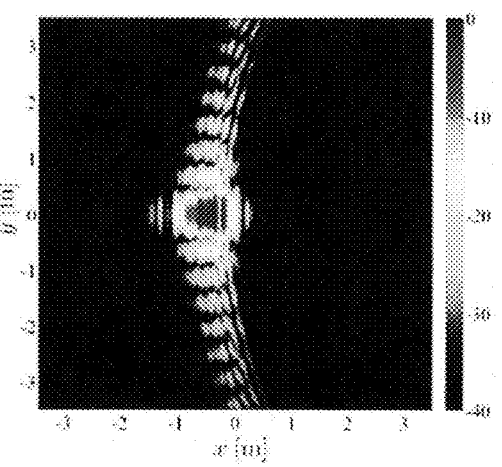
Fig-4d

US 10,018,714 B2

TWO-DIMENSIONAL RF HARMONIC IMAGING SYSTEM AND ALGORITHM

GOVERNMENT INTEREST

The invention described herein may be manufactured, used, and licensed by or for the United States Government.

BACKGROUND OF THE INVENTION

I. Field of the Invention

The present invention relates generally to radar systems and, more particularly, to a radar system using forward-looking radar to detect targets.

II. Description of Related Art

Route clearance and force protection has become of paramount interest in the military, particularly in military ground actions. Currently, to detect targets, such as IEDs as well as other installations, forward-looking radar (FLR) has been used on a mobile ground mounted platform. This FLR is then used to scan the route for force protection in an effort to detect military targets.

The current FLR utilizes a high frequency radio transmitter capable of transmitting a forward-directed beam over a frequency range. This frequency range may vary from one radar system to the next, but a typical radar scanning range would be from 300 megahertz to 1.5 gigahertz. For example, for a step-frequency system, the frequency of the transmitter is incremented in fixed steps, such as 3 megahertz.

When the radar signal encounters an object, an echo is returned back to the radar system at the fundamental frequency of the radar. The distance to the target can then be determined by either time of flight, i.e. the time delay between the generation of the radar signal and the receipt of the echo, or by other means, such as FMCW which measures the frequency difference between the transmitted and received echoes.

All of the previously known FLR systems utilize the fundamental frequency of the radar transmitter to analyze the echo received by the radar system. However, natural objects, such as rocks, also produce an echo back to the radar system at the fundamental frequency of the radar transmitter. Consequently, in order to differentiate between natural objects, such as rocks, and military targets, the previously known FLR systems have utilized complex algorithms in an attempt to image process the received echo. These algorithms, however, have not proven wholly reliable in operation.

SUMMARY OF THE PRESENT INVENTION

The present invention provides an FLR system which overcomes the above mentioned disadvantages of the previously known systems. In brief, the FLR system of the present invention, like the previously known systems, generates a modulated high frequency signal over a frequency range utilizing a wideband transmitting antenna. A receiving antenna then receives any echoes from the transmitted radar signal.

In the previously known linear FLR systems, only the fundamental frequency of the echo was examined to identify potential targets. Excitation of electronic equipment containing electronic devices such as diodes and other nonlinear devices, however, generates harmonics of the fundamental frequency once excited by the radar signal. These harmonics thus form a part of the echo return to the receiving antenna of the FLR system.

Consequently, unlike the previously known FLR systems, the radar system of the present invention processes at least one, and preferably several harmonics of the fundamental frequency in the received echo signal. Although different means may be used to process the harmonics of the received echo, in the present invention the phase shift between the harmonics and the signal generated by the radar system is compared and then tabulated over the various frequencies and their harmonics of the scanning frequency range of the radar system. A 4D data cube containing these data points is then constructed and, once constructed, a two-dimensional harmonic imaging algorithm is used to separate the image represented by the harmonics of the fundamental frequency of the echo. That imaging algorithm then displays the identified target on the appropriate display device.

Consequently, by processing the harmonics of the radar signal, rather than the fundamental frequency of the radar signal, identification of targets containing nonlinear electronic components, such as semiconductor components, the radar system of the present invention is able to differentiate between targets containing electronic components and those targets, such as natural objects, which do not. Since virtually all modern weapons contain electronic circuitry with electronic components, the radar system of the present invention is able to differentiate military targets from natural objects.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 4(a) is a graph showing the first harmonic imaging responses for a nonlinearly loaded free space extended target;

FIG. 4(b) is a graph showing the second harmonic imaging response for a nonlinearly loaded free space extended target;

FIG. 4(c) is a graph showing the third harmonic imaging response for a nonlinearly loaded free space extended target;

FIG. 4(d) is a graph showing the fourth harmonic imaging response for a nonlinearly loaded free space extended target;

DETAILED DESCRIPTION OF A PREFERRED EMBODIMENT OF THE PRESENT INVENTION

Figure 1:
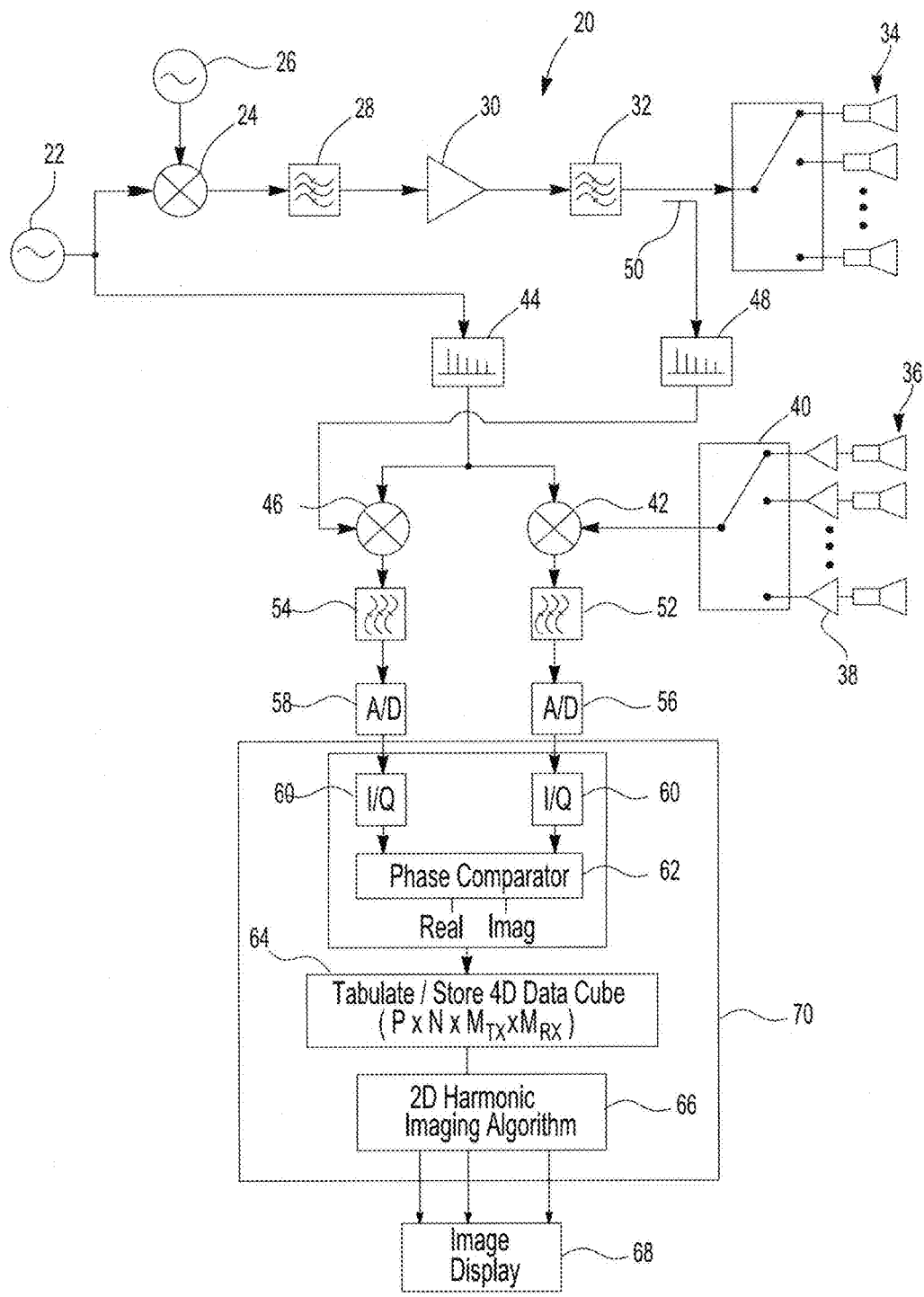
FIG. 1 is a block diagrammatic view illustrating the radar system of the present invention.

With reference first to FIG. 1, a block diagrammatic view illustrating a preferred embodiment of the radar system 20 of the present invention is shown. The radar system 20 includes a step frequency synthesizer 22 which generates a pulse train of signals of varying frequency across a predetermined frequency range in predefined stepped frequency increments. For example, the synthesizer 22 may generate a radio signal in the range of 300 megahertz to 1.5 gigahertz in predetermined steps of 3 megahertz. That output signal from the synthesizer 22 is then divided into two components. One component is fed to a mixer 24 while the other component is used to process the received echo from the system, if any. That processing will be subsequently described in greater detail.

An oscillator 26 also provides an input signal (intermediate frequency, or IF, signal) to the mixer 24 so that an output from the mixer 24 contains both the sum and the difference between the synthesizer 22 and the oscillator 26 frequencies. The oscillator 26 may be of any desired intermediate frequency, such as 1 megahertz.

The output from the mixer 24 is coupled through a bandpass filter 28, amplifier 30, and second bandpass filter 32 and is then coupled as the input to a wideband transmitter array 34. The bandpass filters 28 and 32 serve to remove one of the products from the mixer 24. e.g. F1-F2, while the amplifier 36 increases the power of the signal for increased range of the radar system 20.

It will be understood, of course, that, since the synthesizer frequency varies over the entire frequency range of the radar scan, the bandpass filters 28 and 32 must necessarily be tunable bandpass filters. In addition, the bandpass filter 32 is designed to suppress any harmonic distortions which may be caused by the amplifier 30.

Upon transmission of the radar signal by the antenna 34, the radar signal may contact both natural objects, such as stones, rocks, etc., as well as manmade objects which contain nonlinear devices, such as nonlinear electronic components. Such electronic components are frequently found in targets which represent weapons. Once the radar signal impinges upon natural objects, such as rocks, the natural objects reflect a signal back towards the radar system 20 at only the fundamental frequency of the radar system, i.e. the sum of the frequencies of the synthesizers 22 and 26. Conversely, when nonlinear electronic components, such as semiconductors, are excited by the radar signal, these components return an echo back to the radar system 20 not only containing the fundamental frequency of the radar system 20, but also harmonics of that fundamental frequency. Consequently, by processing only harmonics of the fundamental frequency in the echo for the radar signal, manmade targets may be differentiated from natural objects.

In theory, once a nonlinear circuit, such as a semiconductor device, is excited by a radio wave, that nonlinear device will generate harmonic frequencies nf(n=1, 2, . . . , ∞). However, even though theoretically an infinite number of harmonic frequencies may be generated by the nonlinear device once excited by the radar signal, it is only necessary to examine at least one harmonic, and preferably four or five harmonic frequencies, to accurately differentiate between natural objects and manmade targets.

Consequently, in order to isolate the harmonic frequencies of the radar signal, a wideband receive antenna array 36 has its array elements electrically connected through low noise amplifiers 38 and an electronic switch 40 to a mixer 42. The output from the synthesizer 22 is also coupled through a comb generator 44 as the second input to the mixer 42. The comb generator 44 produces harmonics of the frequency of the synthesizer 22. That frequency, and thus the harmonics at the output of the comb generator 44, will vary as the radar signal is scanned between its lower and its upper frequency limits.

Still referring to FIG. 1, a second mixer 46 also receives the output from the comb generator 44 as one input. The output from the bandpass filter 32 (coupled through a second comb generator 48) is connected as a reference signal to the second input of the mixer 46. A conventional wideband RF coupler may be used to sample the output from the second bandpass filter 32.

Coherent detection for each harmonic order n is accomplished by comparing the scattered signal from the receiver antenna array 36 with the reference signal from the comb generator 48. The mixers 42 and 46 then down-convert the reference and the received signal harmonic sets to the IF band by multiplying each with the output of the comb generator 44. Bandpass filters 52 and 54 are then respectively connected in series to the outputs from the mixers 42 and 46, respectively, to produce signals at the frequencies $nf_{IF}$. These harmonic intermediate frequencies are then converted to digital signals by A/D converters 56 and 58.

The digital output signals from the A/D converters 56 and 58 are then coupled as input signals to an I/Q demodulator 60 having their outputs connected as inputs to the phase comparator 62. The output from the phase comparator 62 then represents the phase difference between the harmonics of the transmitted signal and the harmonics of the received echo for at least one, and preferably several, e.g. four, harmonics of the fundamental frequency of the radar system. The output from the phase comparator 62 contains both a real and an imaginary component.

The output from the phase comparator 62 contains data representing numerous harmonics for each frequency in the stepped frequency range of the synthesizer 22. Furthermore, each harmonic data set contains a time element. Consequently, the phase comparator 62 provides its output to a tabulator 64 which stores the received data in a four-dimensional data cube containing $P \times N \times M_{TX} \times M_{RX}$ where P equals the frequency steps, N equals the number of harmonics being processed (in this example four), $M_{TX}$ equals the number of elements in the transmitter antenna array 34, while $M_{RX}$ equals the number of receive elements in the receive antenna array 36.

The data stored by the tabulator 64 is then provided as data to a two-dimensional harmonic imaging algorithm 66 and ultimately displayed on a display device 68. In practice, a single DSP unit 70 may be used to perform all the processing of the output signals from the data outputs of the A/D converters 56 and 58. Alternatively, a programmed processor may be used to perform the data processing necessary to transform the data from the A/D converters 56 and 58 to a two-dimensional image ready for display on the display device 68.

Figure 2:
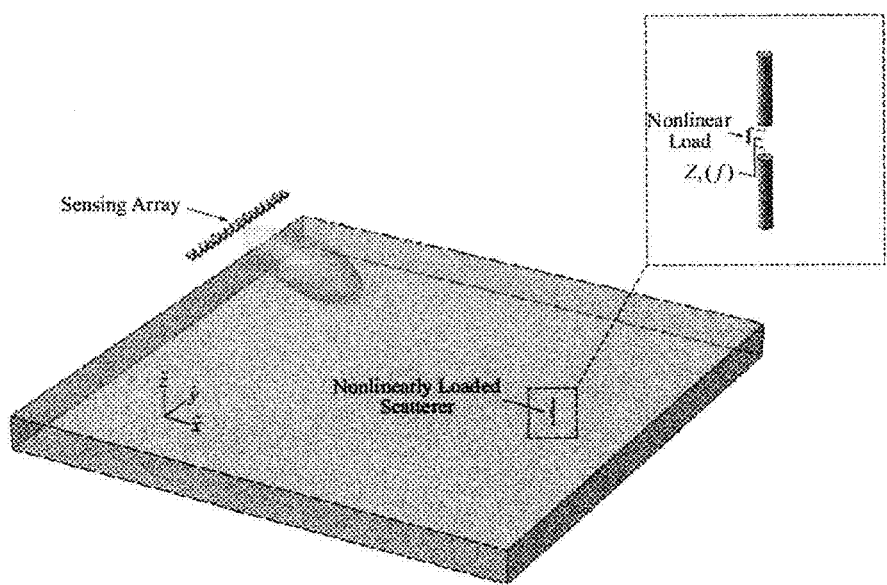
FIG. 2 is a diagrammatic view illustrating the operation of the radar system.

With reference now to FIG. 2, an exemplary imaging algorithm 66 will now be described in which the target (a nonlinearly loaded, perfectly conducting scatterer) is assumed to be excited by infinitesimal electric dipoles at r' transmitting time-harmonic fields at evenly spaced frequencies f∈F={$f_1, f_2, \ldots, f_P$}. Given an induced Norton equivalent short-circuit current $I_{sc}(f) \to i_{sc}(t) = a \cos(2\pi f t + \theta)$, the resultant voltage at the scatterer terminal is of the form $$v_x(t) = \sum_{n=0}^{\infty} \alpha_n(f,a)[\cos(2\pi f t + \theta)]^n = \sum_{n=0}^{\infty} \beta_n(f,a)\cos(2\pi n f t + n\theta). \quad (1)$$

For small signals, $\beta_n(f,a) \approx a^n \gamma_n(f)$. The dependence of the purely real variables $\alpha_n(f,a)$, $\beta_n(f,a)$, and $\gamma_n(f)$ on the scatterer impedance $Z_s(f)$ and the i-v characteristic of the load (i(t)=g(v(t))) is implicit and hence suppressed.

For each instance of excitation at frequency f, the target generates harmonic scattered fields $E_s(r, r', nf)$ at frequencies nf (n≠0): for n=1, the steady-state scattered field is the sum of the structural mode $E_{s,0}(r, r', f)$—that is, the response from the scatterer when it is short-circuited—and the re-radiation mode $E_{s,r}(r, r', f)$; for n>1, only the re-radiation mode $E_{s,r}(r, r', nf)$ exists. The re-radiation mode is evaluated by exciting the scatterer with voltage source $V_s(nf)$ at the terminal, where $V_s(nf)$ is the phasor representation for the signal component of (1) with frequency nf.

For a point-like target at $r_s$, the structural mode can be written as $$E_{x,0}(r,r',f) = G(r,r_s,f) \ell_{s,0}(f) G(r_s,r',f) \ell_{TX}(f), \quad (2)$$

where $\ell_{TX}(f)$ is the current moment of the transmitter, $\ell_{s,0}(f)$ is the scattering strength of the short-circuited target, and G(•, •, f) is the Green's function of the environment; the term $G(r_s, r', f) \ell_{TX}(f)$ can be interpreted as equivalent to a scalar incident field $E_{inc}(r_s, r', f)$. The re-radiation mode can be deduced as follows. First, the short-circuit current is approximated as $$I_{sc}(f) = \ell_e(f) G(r_s,r',f) \ell_{TX}(f), \quad (3)$$

in which $\ell_e(f)$ is the scalar effective length of the scatterer as defined by exciting the terminal with a voltage source. Then from (1), it can be shown that $V_s(nf) = \beta_n(f,|I_{sc}(f)|) e^{jn\angle I_{sc}(f)}$. In turn, the re-radiated field is $$E_{s,r}(r,r',nf) = V_s(nf) G(r,r_s,nf) \ell_r(nf) = \beta_n(f,|I_{sc}(f)|) e^{jn\angle I_{sc}(f)} G(r,r_s,nf) \ell_r(nf), \quad (4)$$

with $\ell_r(nf)$ as the induced current moment at the scatterer due to a unity voltage source placed at the terminal. In view of (2)-(4), a phase conjugation approach is proposed to obtain an imaging functional to locate the target at each harmonic order n:

$$\Psi_n(r) = \sum_{TX} \sum_{RX} \sum_F W(f) E_s(r, r', nf)[G(r_s, r', f)^n G(r, r_s, nf)]^*, \quad (5)$$

where TX and R, respectively, represent the transmitter and receiver array spaces (which are assumed to be co-located), W(f) is a spectral window function, and * denotes the conjugation operation. The above imaging functional is not limited to only low-power (small-signal) operations; it is general enough so that it can accommodate high-power (large-signal) sensing as well—which may be needed to detect targets with very weak nonlinear scattering.

The point spread function characteristics of (5) for free-space and near-ground (on-surface and shallow-buried) targets can be derived in a known fashion. The FLR sensing geometry (FIG. 2) affords rather poor resolution in the vertical—or elevation—direction, so the predominant issue of interest here is the behavior of the point spread function across the horizontal plane. In the forward-looking—or broadside—direction, assuming a rectangular spectral window, the first-null down-range and angular cross-range resolutions of $\Psi_n(r)$, respectively, can be shown to be $$\delta r = \frac{1}{n} \cdot \frac{c_o}{2\Delta f}; \quad (6)$$

$$\delta \phi = \frac{1}{n} \cdot \frac{\lambda_{c,o}}{2L}; \quad (7)$$

where $c_0$ is the velocity of the electromagnetic wave in free space; Δf is the bandwidth of F; $\lambda_{c,0}$ is the wavelength at the center frequency of F; and L is the width of the transceiver array aperture. Results (6) and (7) are valid for a monostatic sensing geometry as well as a bistatic configuration with two end-transmitters (i.e., one transmitter located at each end of the array and receiving over the entire aperture). For a fully multistatic system or a bistatic system with only one transmitter, (6) still holds, but the cross-range resolution is twice of that stated in (7). A tapered spectral window can be applied to suppress the sidelobes in range—at the expense of degrading the down-range resolution; in practice, note that depending on the nature of the window and the sensing configuration, the cross-range imaging behavior could also be affected. It is important to emphasize that the formulations for the resolution and the observations given above are equally valid for both free-space and near-ground target imaging.

In general, for a non-point-like—or extended—target and an arbitrary vector incident field, (3) and (4) should be modified, respectively, as $$I_{sc}(f) = E_{inc}(r_s,r',f) \ell_e(f); \quad (8)$$

and $$E_{s,r}(r,r',nf) = \beta_n(f,|I_{sc}(f)|) e^{jn\angle I_{sc}(f)} E_r(r,r_s,nf); \quad (9)$$

where $\ell_e(f)$ is the vector effective length of the scatterer and $E_r(r, r_s, nf)$ is the radiated field pattern of the scatterer when excited with a unity voltage source. Also note that the structural mode for an extended target can be written as a superposition of responses from point-like scatterers. To obtain the most general treatment, the framework above can be expressed in terms of the dyadic Green's function for the vector field problem; nevertheless, it is seen that it is sufficient to evaluate the imaging functional (5) by using the dominant field and Green's function components of interaction.

For validation purposes with simulation, the electromagnetic response of the scatterer is computed using a hybrid method-of-moments and harmonic balance approach, together with an asymptotic field propagator. The impedance of the scatterer $Z_s(f)$ and the short-circuit current at the scatterer terminal $I_{sc}(f)$ are first characterized in the spectral domain by applying the free-space and half-space mixed-potential integral equation solver. Then—in the circuit domain—a harmonic balance technique is employed for obtaining the terminal voltage response $V_s(nf)$ of the target connected to the nonlinear load: in essence, after dividing the equivalent circuit for the scatterer into linear and nonlinear sections at the terminal reference plane and applying the standard nodal current law, a nonlinear matrix system is established and subsequently solved with an iterative method. Finally, the resultant harmonic currents over the structure are deduced using the integral equation solver once again. Note that for the half-space problem, for the calculation of the dyadic and scalar Green's functions within the integral equation solver, exact Sommerfeld integrals are used. To increase the computational efficiency, a tabulation-and-interpolation routine is employed for evaluating these integrals. On the other hand, for field scattering and propagation, the second-order-accurate asymptotic approximations to the integrals are exploited instead; such a treatment allows the second-order surface wave component to be included in the solution.

A free-space point-like target is examined first using the framework presented in the above sections. The target is a small vertical dipole element with length $l<<\lambda_{min}$, where $\lambda_{min}$ is the minimum wavelength over the harmonic frequency bands used for imaging. The dipole is center-loaded with a diode with $i(t)=I_o(\exp(v(t)/v_t)-1)$. $I_o=10$ nA, $v_t=26$ mV. The sensing geometry is as illustrated in FIG. 2: the linear array is composed of 17 equally spaced elements distributed over a 2 m-wide aperture; the center of the array is at (10, 0, 2) m, with the target situated at the coordinate origin. A bistatic configuration employing a single illuminator is assumed: the illuminator—with transmitted power of 10 W at all incident frequencies and located at the center of the array—is a vertical infinitesimal electric dipole operating over the frequency band [300 MHz, 1.5 GHz] in P=401 steps. For image generation, the scattered fields up to the fourth harmonic are collected for each frequency. (Here then $\lambda_{min}$ corresponds to the wavelength at frequency $4f_p$.) FIG. 3 shows $|\Psi_n(r)|$ for n=1, 2, 3, 4. (The derived imaging theory can be applied to higher orders of n, of course, but for demonstration purposes, only the results for up to the fourth order are included in this work.) The Green's function $G(\cdot,\cdot,f)$ within (5) is calculated asymptotically. The images are constructed without any spectral window and are seen to match the theoretical point spread function very well, with the resolutions as predicted by (6) and (7); the down-range and cross-range imaging sidelobe artifacts are also consistent with expectations. It should be noted that the re-radiated field $E_{s,r}(r, r', nf)$ is of the form $\propto f^{n+2}$ in the small-signal regime whereas the structural scattered mode $E_{s,0}(r, r', f)$ is $\propto f^2$ (Rayleigh scattering); these frequency dependencies can also be readily derived from (2) and (4).

Figure 3A:
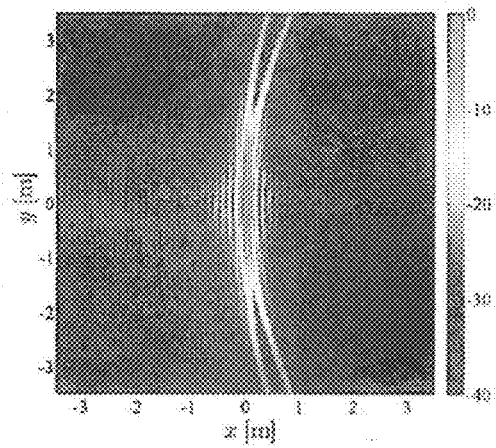
FIG. 3(a) is a graph showing the first harmonic scatter response for a nonlinearly loaded point target in free space.
Figure 3B:
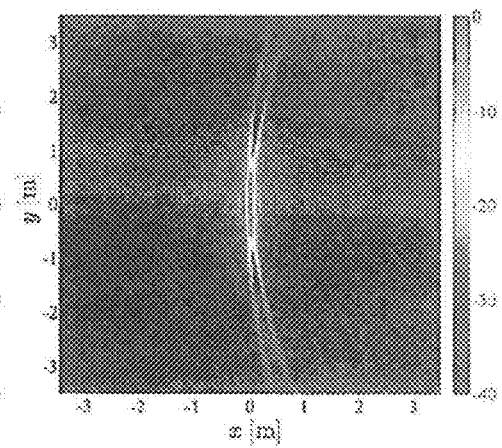
FIG. 3(b) is a graph showing the second harmonic scatter response for a nonlinearly loaded point target in free space.
Figure 3C:
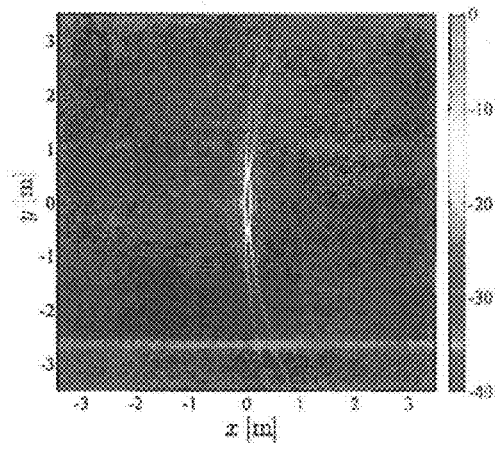
FIG. 3(c) is a graph showing the third harmonic scatter response for a nonlinearly loaded point target in free space.
Figure 3D:
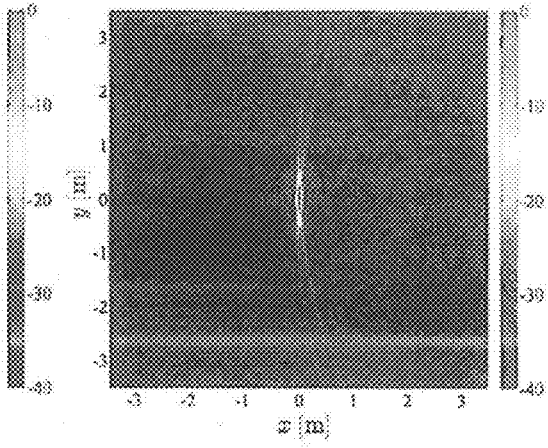
FIG. 3(d) is a graph showing the fourth harmonic scatter response for a nonlinearly loaded point target in free space.

The harmonic imaging responses for a nonlinearly loaded point target are shown in FIGS. 3(a)-3(d). FIG. 3(a) shows the first harmonic imaging response while FIGS. 3(b)-3(d) respectively show the second through fourth harmonic imaging responses.

The imaging and scattering characteristics of on-surface and shallow-buried point-like targets are similar to those of the free-space case and therefore are not explicitly included here.

A nonlinearly loaded extended scatterer is considered next. The scatterer is a vertical dipole element of length l=0.5 m, center-loaded with a diode; the parameters of the diode and the sensing configuration are the same as those described above. For the half-space problem, the ground soil has relative dielectric constant $\in_r=4$ and conductivity $\sigma=15$ mS/m, and the target is positioned directly on top of the surface or buried at 3 cm depth. For the time domain signal reconstruction, the step-frequency-based excitation waveform is derived by taking the inverse Fourier transform of a Blackman spectral window. It is seen that, in these examples, the dominant contribution to the first-order harmonic return is provided by the structural mode scattering. As a result, at least according to the frequency domain plots, the first-order harmonic response is quite dissimilar from the higher-order (n>1) ones. The reverberations seen in the first-order harmonic time and image domain signals are due to single- and multiple-order diffractions from the ends of the dipole; these diffraction effects are also noted for the higher-order harmonic signals, though they are not as well-defined as those in the first-order harmonic case, tin general, a direct correspondence between the peaks of the time domain signal and the maxima in the image may not be readily observable in these results because of the complicated diffraction effects; however, an approximate equivalence between the time and image domain responses does exist for free-space and above-ground targets: it can be shown that the time domain response of a transmitter and receiver pair is twice the real part of the complex image response contribution due to that pair.) This spectral modulation makes it difficult to identity a specific order of diffraction from the dipole ends in the higher-order harmonic time and image responses. For the free-space and above-ground target cases, the higher-order harmonic frequency domain responses forn>1 are weaker over the second half of the band than over the first half since the main lobe of $f_e(f)$ for the vertical dipole—which occurs near the broadside direction (or near the plane of the ground) at the lower frequencies—shifts to higher elevation angles as the frequency increases toward 1.5 GHz as such, the induced short-circuit current $I_{sc}(f)$ is reduced over the second half of the band, where the small-signal regime consequently occurs and, thus, the scattering signal intensity in general decreases with increasing harmonic number (i.e., $E_{s,r}(r, r', nf) \propto |I_{sc}(f)|^n$). For the buried-target case, as expected, the scattering signal intensities on average are much weaker as compared to those of the free-space and on-surface target cases, and the small-signal regime is applicable over the entire band. Note that the four principal local maxima are observed in the higher-order harmonic spectral responses and they correspond to the resonance frequencies of $f_c(f)$.

The harmonic imaging responses for a nonlinearly loaded extended target will vary depending upon the environment of the target. For example, the imaging responses for a free space extended target are shown in FIGS. 4(a)-4(d). FIG. 4(a) shows the first harmonic imaging response while FIGS. 4(b)-4(d) respectively show the second through fourth harmonic imaging responses.

Figure 5A:
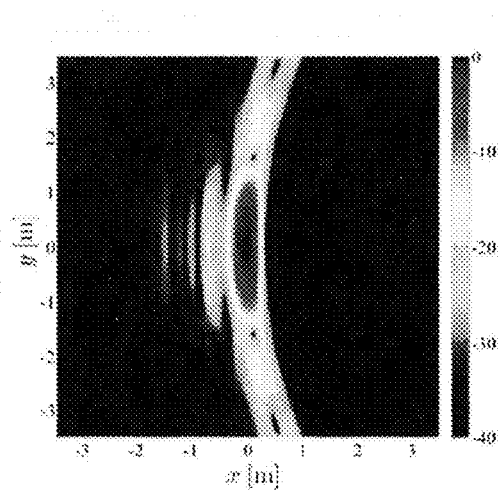
FIG. 5(a) is a graph showing the first harmonic imaging responses for a nonlinearly loaded on surface extended target.
Figure 5B:
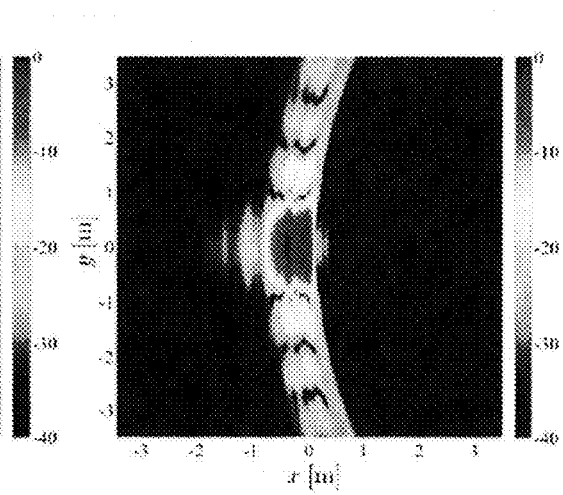
FIG. 5(b) is a graph showing the second harmonic imaging response for a nonlinearly loaded on surface extended target.
Figure 5C:
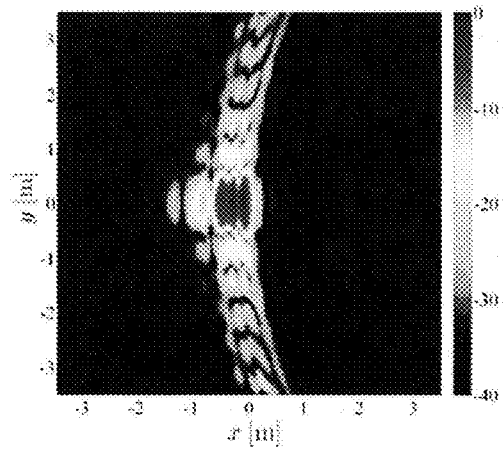
FIG. 5(c) is a graph showing the third harmonic imaging response for a nonlinearly loaded on surface extended target.
Figure 5D:
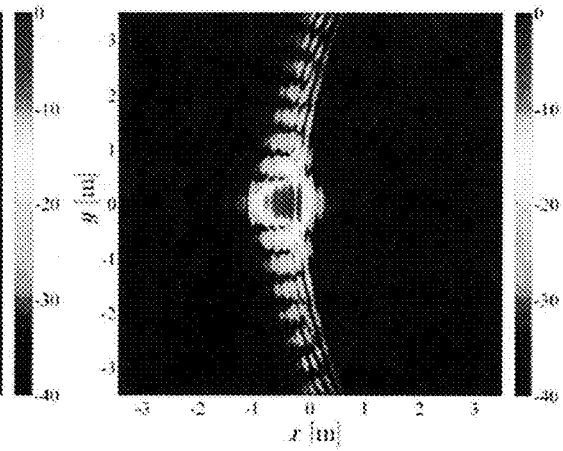
FIG. 5(d) is a graph showing the fourth harmonic imaging response for a nonlinearly loaded on surface extended target.

Similarly, the imaging responses for a surface extended target are shown in FIGS. 5(a)-5(d). FIG. 5(a) shows the first harmonic imaging response while FIGS. 5(b)-5(d) respectively show the second through fourth harmonic imaging responses.

Figure 6A:
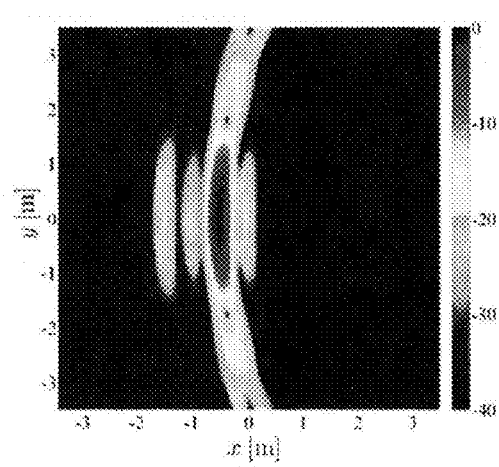
FIG. 6(a) is a graph showing the first harmonic imaging responses for a nonlinearly loaded subsurface extended target.
Figure 6B:
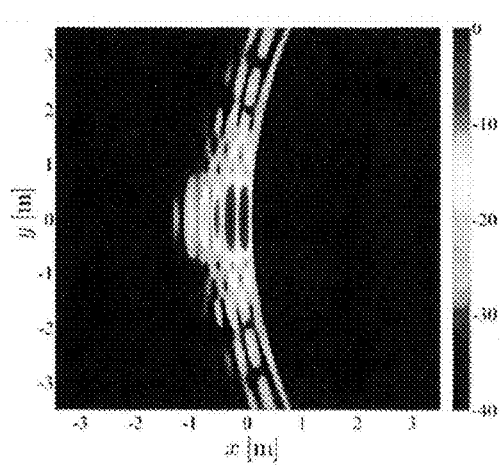
FIG. 6(b) is a graph showing the second harmonic imaging response for a nonlinearly loaded subsurface extended target.
Figure 6C:
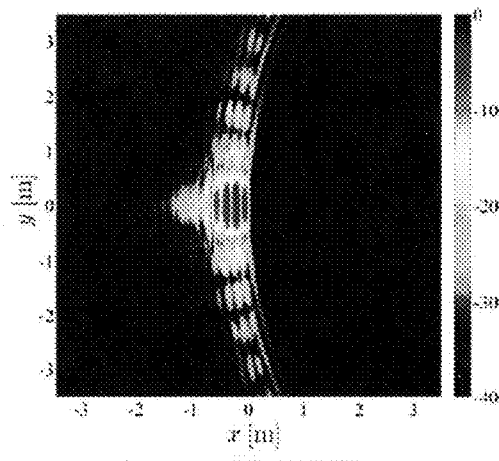
FIG. 6(c) is a graph showing the third harmonic imaging response for a nonlinearly loaded subsurface extended target.
Figure 6D:
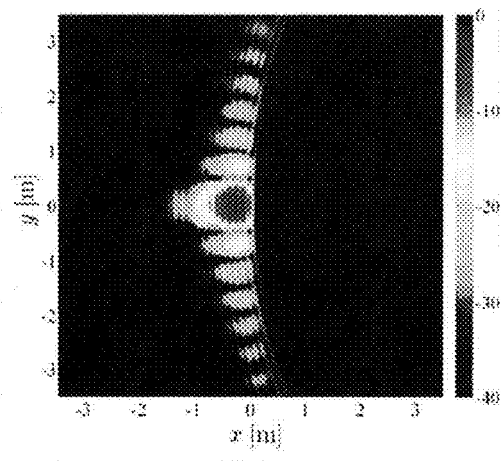
FIG. 6(d) is a graph showing the fourth harmonic imaging response for a nonlinearly loaded subsurface extended target.

Likewise, the imaging responses for a subsurface extended target are shown in FIGS. 6(a)-6(d). FIG. 6(a) shows the first harmonic imaging response while FIGS. 6(b)-6(d) respectively show the second through fourth harmonic imaging responses.

As can be seen from FIGS. 4-6, the actual harmonic scattering responses are functions of the environment of the target and the harmonic order. However, by using Green's function to accommodate for the environment of the target as previously described, high resolution images of targets may be obtained for these different target environments.

The images can also be constructed with only sub-band data—that is, for instance, given that a stronger response is observed over the first half of the band for the free-space and above-ground cases, one may choose to generate the images using the signal only from that sub-band; this, of course, would lead to a loss in image resolution.

The standoff sensing method investigated herein is envisioned for use primarily in the short range. From asymptotic analysis, in the small-signal regime, it can be shown that the amplitude of the n-th harmonic backscattered field has a dependence of the form $\propto \rho^{-2(n+1)}$, where $\rho$ is the radial distance from the transceiver to the scatterer. The faster propagation attenuation rate of the higher-order harmonic signal intensities as a function of distance requires high power to be transmitted for long range applications.

From the foregoing, it can be seen that the present invention provides a radar system and method for analyzing the echo of the radar system which is able to differentiate between natural objects and electronic component containing targets. Having described my invention, however, many modifications thereto will become apparent to those skilled in the art to which it pertains without deviation from the spirit of the invention as defined by the scope of the appended claims.

I claim:

1. A radar system for detecting a target containing non-linear electronic components comprising:
    a radio frequency transmitter which generates a radar signal at a fundamental frequency,
    a modulator which modulates said radar signal at a modulation frequency, said modulated radar signal being coupled to a transmission antenna,
    a receiver which receives an echo from the radar signal,
    a filter which isolates harmonics of said fundamental frequency from said echo,
    a demodulator which compares the phase of said harmonics of said echo with the phase of harmonics of said radar signal and generates an output signal representative thereof,
    an imaging algorithm which receives said output signal and creates a two-dimensional image of the received echo, and
    a display to display said two-dimensional image.

2. The apparatus as defined in claim 1 wherein said receiver comprises comb generators.

3. The apparatus as defined in claim 1 wherein said transmitter transmits said radar signal in sequential frequency steps over a predetermined frequency range.

4. The apparatus as defined in claim 1 wherein said imaging algorithm comprises a programmed processor.

5. The apparatus as defined in claim 4 wherein said imaging algorithm comprises a digital signal processor unit.

6. The apparatus as defined in claim 1 wherein said imaging algorithm comprises an algorithm to modify the echo as a function of the electromagnetic parameters of the environment in which the target is located.

7. The apparatus as defined in claim 6 wherein the target is above surface.

8. The apparatus as defined in claim 1 wherein said imaging system creates an image for each harmonic order.

9. The apparatus as defined in claim 1 wherein said imaging algorithm incorporates environmental propagation factors.

* * * * *